United States Patent
Milne et al.

[11] Patent Number: 5,848,069
[45] Date of Patent: Dec. 8, 1998

[54] METHOD FOR SIGNALING LINK SELECTION

[75] Inventors: Richard E. Milne, Richardson; Timothy M. Dwight, Plano, both of Tex.

[73] Assignees: DSC Telecom L.P., Plano, Tex.; MCI Communications Corp., Washington, D.C.

[21] Appl. No.: 703,860

[22] Filed: Aug. 27, 1996

[51] Int. Cl.[6] .................................................. H04J 3/12
[52] U.S. Cl. ............................................ 370/426; 379/230
[58] Field of Search .................................. 370/410, 426; 379/230, 229

[56] References Cited

U.S. PATENT DOCUMENTS

| | | | |
|---|---|---|---|
| 5,029,165 | 7/1991 | Choi et al. | 370/410 |
| 5,650,998 | 7/1997 | Angenot et al. | 370/225 |

OTHER PUBLICATIONS

Wang, J., Traffic Routing and Performance Analysis of the Common Channel Signaling System 7 Network, Globecom 1991, pp. 301–305.

*Primary Examiner*—Chi H. Pham
*Assistant Examiner*—W. Todd Baker
*Attorney, Agent, or Firm*—Baker & Botts, L.L.P.

[57] ABSTRACT

A method for selecting one link out of M outbound links in a linkset (10) coupling a first component and a second component is provided. The first component includes N devices coupled to the M links. The method includes the steps of first providing an X-bit code having $2^x$ possible code combinations used for link selection, and assigning a predetermined number of code combinations for each device where the assigned code combinations for a device is a function of an unique device number associated with each device. The outbound link is then selected for transmitting outbound data based on the code combination assignment.

22 Claims, 1 Drawing Sheet

METHOD FOR SIGNALING LINK SELECTION

TECHNICAL FIELD OF THE INVENTION

This invention is related in general to the field of telecommunications. More particularly, the invention is related to a method for signaling link selection.

BACKGROUND OF THE INVENTION

Signaling system Number 7 or SS7 is the international standard for common channel signaling (CCS) specified by the Consultative Committee on International Telephone and Telegraph (CCITT). SS7 meets the requirements of call control signaling for telecommunication services such as POTS (plain old telephone service), ISDN (integrated services digital network), and circuit switched data transmission services.

In SS7, functions are divided into a message transport part (MTP) and separate user parts. In the header of the message transfer part is an 8-bit field, bits numbered 0–7, that is designated to the function of distributing traffic over a linkset. These eight bits are called the signaling link selection code (SLS). Currently, only bits 0–3 of the signaling link selection code are used to specify onto which link in a linkset messages are to be routed. A linkset may have up to sixteen separate links.

Given the four bits that are currently used for link selection, there are sixteen possible codes. Each link between any two network components, such as a switch and a signal transfer point (STP), is assigned at least one of the codes. The sixteen signaling link selection codes are distributed as evenly as possible over the links in the linkset. If the number of links is a power of two, i.e., is equal to $2^n$ for some integer value of n, the distribution is exactly even, so that the utilization of each link is the same. If the number of links is not a power of two, then some links are assigned more codes than others, which results in an imbalance in the utilization of the links in the linkset. The magnitude of the imbalance varies depending on the number of links in the linkset. This imbalance can be as much as 2:1 under the current method of link selection, where one or more link carries twice the load as the rest of the links. This creates an unacceptable burden on a subset of the links.

A trivial solution is to always provide a number of links that is a power of two. However, doubling the number of links on all switches every time an augmentation to the system is required due to increased traffic is expensive and over-utilizes the ports on the SS7 network. Further, as links may fail in a linkset, the number of functioning links may not be controllable other than to purposefully and wastefully disable a number of links so that the number remaining again is a power of 2. Therefore, the deployment of linksets whose number of links is always a power of two is not practical and acceptable.

SUMMARY OF THE INVENTION

Accordingly, there is a need for a method for signaling link selection that better balances the traffic load among the links in a linkset.

In accordance with the present invention, a method for signaling link selection is provided which eliminates or substantially reduces the disadvantages associated with prior methods and practices.

In one aspect of the invention, a method for selecting one link out of M outbound links in a linkset coupling a first component and a second component is provided. The first component includes N devices coupled to the M links. The method includes the steps of first providing an X-bit code having $2^x$ possible code combinations used for link selection, and assigning a predetermined number of code combinations for each device where the assigned code combinations for a device are a function of a unique device number associated with each device. The outbound link is then selected for transmitting outbound data based on the code combination assignment.

In another aspect of the invention, the method includes the steps of providing an X-bit signaling link selection code having $2^x$ possible code combinations, and assigning a predetermined number of code combinations for each device by performing a modulo operation. Based on the modulo operation, the codes combinations are assigned to links in each device, and used in selecting the outbound link.

BRIEF DESCRIPTION OF THE DRAWINGS

For a better understanding of the present invention, reference may be made to the accompanying drawings, in which.

DETAILED DESCRIPTION OF THE INVENTION

Figure 1:
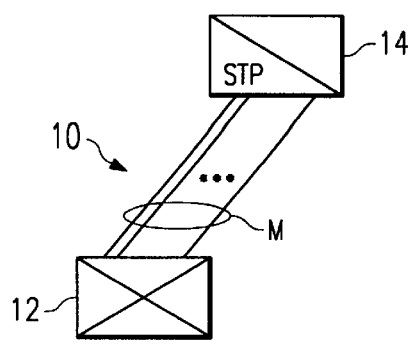
FIG. 1 is a simplified block diagram of an exemplary operating environment of the signaling link selection method according to the teachings of the present invention.

The preferred embodiment of the present invention is illustrated in FIGS. 1–4, like reference numerals being used to refer to like and corresponding parts of the various drawings.

Referring to FIG. 1, an exemplary operating environment of the teachings of the present invention is shown. A linkset 10 having M links couple a switch 12 and a signal transfer point (STP) 14. As provided in ANSI Specification T1.111.5, and section 7.3.1.1, linkset 10 currently has a maximum of sixteen links.

Figure 2A:
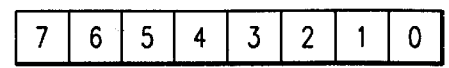
FIG. 2A shows a 5-bit signaling link selection code in SS7, where only bits 0–3 are used for the purpose of link selection.
Figure 2A:
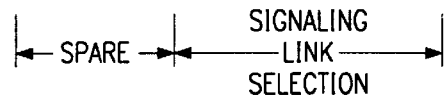
Figure 2B:
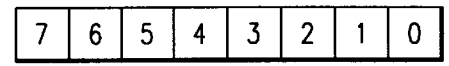
FIG. 2B shows an 8-bit signaling link selection code in SS7, where only bits 0–6 are used for the purpose of link selection.
Figure 2B:

The signaling system number 7 (SS7) mechanism for distributing message traffic among M links in linkset 10 is to use an 8-bit field in the message called the signaling link selection code (SLS). The signaling link selection code is carried in the message transport part (MTP) header of the messages. The method, as proposed by the teachings of the present invention, is applicable to the 5-bit code as well as the 8-bit code, as shown in FIGS. 2A and 2B, respectively. In the 5-bit SLS code, only bits 0–3 are used for the purpose of link selection; in the 8-bit SLS code, only bits 0–6 are used for link selection. Currently technology only uses bits 0–3 of the signaling link selection code to specify onto which link in a linkset messages are to be routed. The 8-bit code was proposed to address the traffic imbalance problem, and has been accepted by ANSI with respect to two of its SS7 specifications.

Referring to TABLE A below, an exemplary prior art signaling link selection code assignment to a linkset having three links, numbered 1–3, is shown.

TABLE A (PRIOR ART)

| LINK NUMBER | 1 | 2 | 3 |
|---|---|---|---|
| SLS | 0 | 1 | 2 |
| CODE | 3 | 4 | 5 |
| ASSIGNMENT | 6 | 7 | 8 |
|  | 9 | 10 | 11 |
|  | 12 | 13 | 14 |
|  | 15 | — | — |
| NUMBER OF SLS CODES | 6 | 5 | 5 |

Because three is not a power of two, the code assignment is not exactly even. When the codes are as evenly distributed among the links as possible, link number 1 is assigned six codes, and link number 2 and 3 are each assigned only five codes. Accordingly, link number 1 receives a disproportionate amount of traffic destined for this linkset. As a result, link number 1, statistically, carries 20% more traffic than the other two links. In the worst possible case (which occurs when the number of links in the linkset is 9, 10, 11, 12, 13, 14, or 15), one or more links is assigned to carry twice the load as other links in the same linkset.

Figure 3:
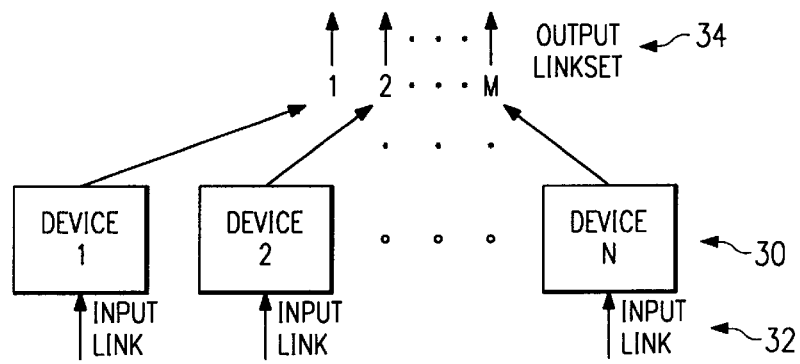
FIG. 3 is a more detailed block diagram of an exemplary operating environment of the signaling link selection method according to the teachings of the present invention.

FIG. 3 shows a simplified block diagram of a relevant portion of a distributed telecommunications switching system, which includes a plurality of devices 30, numbered 1 through N, that perform the tasks of receiving incoming messages on input links 32, and determining which outbound links in linkset 34 to transmit these messages. It should be noted that the distribution of incoming signaling link selection codes is balanced due to the code rotation by the sender prior to sending messages to devices 30. Devices 30 examine the signaling link selection code of each message and then determine an outbound link number according to the predetermined code-to-link assignment. The code assignment may be stored in a table indexed by the signaling link selection code.

In order to resolve the load imbalance problem, the signaling link selection is made a function of the device number of the device routing the message, ƒ(device number), so that the code assignment for the links is randomized for the devices. Using the example of three outbound links, a first device may receive the following code assignments:

TABLE B

DEVICE NUMBER 1

| LINK NUMBER | 1 | 2 | 3 |
|---|---|---|---|
| SLS | 0 | 1 | 2 |
| CODE | 3 | 4 | 5 |
| ASSIGNMENT | 6 | 7 | 8 |
|  | 9 | 10 | 11 |
|  | 12 | 13 | 14 |
|  | 15 | — | — |
| NUMBER OF SLS CODES | 6 | 5 | 5 |

Pursuant to ƒ(device number), the second device may have the following signaling link selection code assignment shown in TABLE C.

TABLE C

DEVICE NUMBER 2

| LINK NUMBER | 1 | 2 | 3 |
|---|---|---|---|
| SLS | — | 0 | 1 |
| CODE | 2 | 3 | 1 |
| ASSIGNMENT | 5 | 6 | 4 |
|  | 8 | 9 | 10 |
|  | 11 | 12 | 13 |
|  | 14 | 15 | — |
| NUMBER OF SLS CODES | 5 | 6 | 5 |

The third device may have the code assignment shown in TABLE D according to the teachings of the present invention.

TABLE D

DEVICE NUMBER 3

| LINK NUMBER | 1 | 2 | 3 |
|---|---|---|---|
| SLS | — | — | 0 |
| CODE | 1 | 2 | 3 |
| ASSIGNMENT | 4 | 5 | 6 |
|  | 7 | 8 | 9 |
|  | 10 | 11 | 12 |
|  | 13 | 14 | 15 |
| NUMBER OF SLS CODES | 5 | 5 | 6 |

It may be seen that, in each of the devices, a different link carries the burden of the additional signal link selection code, so that the effect is a better balanced distribution of the traffic load among all the links in the linkset.

One function which may be used to determine the code-to-link assignment is:

$$f(\text{devicenumber modulo M})$$

where M is the number of functioning links in the outbound linkset, and assuming incoming traffic is evenly distributed across all N devices. The modulo operation creates a number of categories of devices, depending on the device number. For example, if there were three links in the linkset, three categories of devices would be created by the modulo operation. The signaling link selection code assignment can be summarized as:

TABLE E

SLS CODE ASSIGNMENT

| LINK NUMBER | CATEGORY 0 DEVICE | CATEGORY 1 DEVICE | CATEGORY 2 DEVICE |
|---|---|---|---|
| 1 | 0, 3, 6, 9, 12, 15 | 2, 5, 8, 11, 14 | 1, 4, 7, 10, 13 |
| 2 | 1, 4, 7, 10, 13 | 0, 3, 6, 9, 12, 15 | 2, 5, 8, 11, 14 |
| 3 | 2, 5, 8, 11, 14 | 1, 4, 7, 10, 13 | 0, 3, 6, 9, 12, 15 |

It may be seen from TABLE E that in the device categories, a different link receives additional code assignments. The effect is a distribution of the extra traffic load to all the links in the outbound link which eliminates the imbalance problem. It may be seen also that all the possible code combinations are separated into three (equal to the number of links) groups or subsets, where the subsets have no interception of code combinations and the size of the subsets differ only by one element. Each group of codes is assigned to a different link in each device category.

Further, if there were only three devices, each category would have one of the devices. If there were four devices, category 1 would have two of the devices (device numbers 2 and 4), and categories 0 and 2 would each have one device. If there were five devices, categories 1 and 2 would both have two devices, and category 0 would only have one. If there were six devices, all three categories would have two devices. It may be seen that if the number of devices in each category is the same, then the link utilization is balanced. In some applications, where the number of devices in each category may not be the same, one or more links may still have a somewhat heavier traffic load, but the unbalanced effect is substantially lessened, assuming large N. Where the number of devices does not evenly divide the number of links, the load imbalance may be minimized by the provision of a larger number of devices performing the link selection task.

Figure 4:
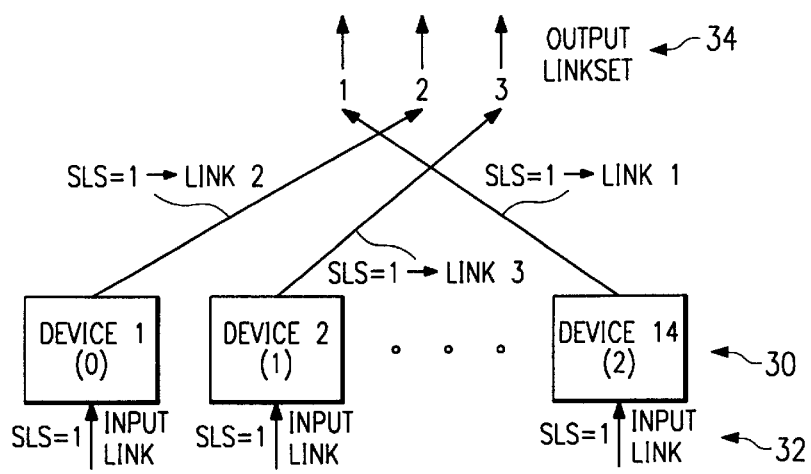
FIG. 4 is a block diagram showing an exemplary application of the teachings of the present invention.

FIG. 4 is a block diagram illustrating an exemplary code assignment for three outbound links and fourteen devices according to the teachings of the present invention. Where an input link message carries a signaling link selection code of one, the devices in different categories pick different outbound links. Device number 1, belonging to category 0, may select link 2; device number 2, belonging to category 1, may select link 3; and device number 14, belonging to category 2, may select link 1.

The method for signaling link selection according to the present invention is applicable to an X-bit signaling link selection code, where X is a positive integer. Therefore, there are $2^x$ possible code combinations, a predetermined number of which is assigned to each device according to a modulo operation, and then used to select the outbound link. This method is applicable to the current standard of 5-bit code as well as the 8-bit code that is being contemplated by the industry.

Although the present invention and its advantages have been described in detail, it should be understood that various changes, substitutions and alterations can be made therein without departing from the spirit and scope of the invention as defined by the appended claims.

What is claimed is:

1. A method for selecting one link out of M links in a linkset coupling a first component and a second component for transferring data from said first component to said second component, said first component having N devices coupled to said M links, the method comprising the steps of:

providing an X-bit code having $2^x$ possible code combinations used for link selection;

assigning a predetermined number of code combinations for each device where the predetermined number of assigned code combinations for a device is a function of a unique device number associated with each device; and selecting a link for transmitting outbound data from one of said devices based on said assigned code combinations.

2. The method, as set forth in claim 1, wherein said assigning step includes the step of performing at least one device number modulo M operation.

3. The method, as set forth in claim 1, wherein said assigning step includes the steps of:

performing a device number modulo M operation for each device;

assigning code combinations to each device according to said modulo operation; and storing said assigned code combinations for each device in a table indexed by said unique device numbers.

4. The method, as set forth in claim 1, wherein said assigning step includes the steps of:

substantially evenly dividing said $2^x$ code combinations into N subsets, where said N subsets have no interception of code combinations and no one subset size is more than one integer larger than another subset;

for assigned code combinations in a first device, assigning a first subset to said first device, a second subset to a second device, and so on until all N subsets are accordingly assigned to different devices;

for assigned code combinations in a second device, assigning said first subset to said second device, said second subset to a third device, and so on until all N subsets are accordingly assigned to different devices; and repeating said above step for each assigned code combinations in each of said N devices.

5. The method, as set forth in claim 4, wherein said assigning step further comprises the step of storing said assigned code combinations for each device in a table indexed by said unique device numbers.

6. The method, as set forth in claim 1, wherein said assigning step includes the steps of:

performing a device number modulo M operation for each device;

creating a category for each unique result from said modulo operation;

assigning said devices to said created categories; and assigning a different set of code combinations to each device in each category, so that each device receives a different assignment in each category.

7. The method, as set forth in claim 1, wherein said X-bit code is a 5-bit code, four bits of which are used for signaling link selection, said code having $2^4$ or sixteen possible code combinations.

8. The method, as set forth in claim 1, wherein said X-bit code is an 8-bit code, seven bits of which are used for signaling link selection, said code having $2^7$ or 128 possible code combinations.

9. A method for selecting one link out of M links in a linkset coupling a first component and a second component in a telecommunications network for transferring messages from said first component to said second component, said first component having N devices coupled to said M links, the method comprising the steps of:

providing an X-bit signaling link selection code having $2^x$ possible code combinations;

assigning a predetermined number of code combinations for each device where the predetermined number of assigned code combinations for a device is a function of a unique device number associated with each device; and selecting a link for transmitting outbound messages from one of said devices to said second component based on said assigned code combinations.

10. The method, as set forth in claim 9, wherein said assigning step includes the steps of:

performing a device number modulo M operation for each device;

assigning code combinations to each device according to said modulo operation; and storing said assigned code combinations for each device in a table indexed by said unique device numbers.

11. The method, as set forth in claim 9, wherein said assigning step includes the steps of:

substantially evenly dividing said $2^x$ code combinations into N subsets, where said N subsets have no interception of code combinations and no one subset size is more than one integer larger than another subset;

for assigned code combinations in a first device, assigning a first subset to said first device, a second subset to a second device, and so on until all subsets are assigned to different devices;

for assigned code combinations in a second device, assigning said first subset to said second device, a second subset to a third device, and so on until all subsets are assigned to different devices; and repeating said above step for each assigned code combination in each of said N devices.

12. The method, as set forth in claim 11, wherein said assigning step further comprises the step of storing said assigned code combinations for each device in a table indexed by said unique device numbers.

13. The method, as set forth in claim 9, wherein said assigning step includes the steps of:

performing a device number modulo M operation for each device;

creating a category for each unique result from said modulo operation;

assigning said devices to said created categories; and assigning a different set of code combinations to each device in each category, so that each device receives a different assignment in each category.

14. The method, as set forth in claim 9, wherein said X-bit code is a 5-bit code, four bits of which are used for signaling link selection, said code having $2^4$ or sixteen possible code combinations.

15. The method, as set forth in claim 9, wherein said X-bit code is an 8-bit code, seven bits of which are used for signaling link selection, said code having $2^7$ or 128 possible code combinations.

16. An improved method for signaling system number 7 for selecting one link out of M links in a linkset coupling a first component and a second component in a telecommunications network for transferring messages from said first component to said second component, said first component having N devices coupled to said M links, the method comprising the steps of:

providing an X-bit signaling link selection code having $2^x$ possible code combinations;

assigning a predetermined number of code combinations for each device where the predetermined number of assigned code combinations for a device is a function of a unique device number associated with each device; and selecting a link for transmitting outbound messages from one of said devices to said second component based on said assigned code combinations.

17. The method, as set forth in claim 16, wherein said assigning step includes the steps of:

performing a device number modulo M operation for each device;

assigning code combinations to each device according to said modulo operation; and storing said assigned code combinations for each device in a table indexed by said unique device numbers.

18. The method, as set forth in claim 16, wherein said assigning step includes the steps of:

substantially evenly dividing said $2^x$ code combinations into N subsets, where said N subsets have no interception of code combinations and no one subset size is more than one integer larger than another subset;

for assigned code combinations in a first device, assigning a first subset to said first device, a second subset to a second device, and so on until all subsets are assigned to different devices;

for assigned code combinations in a second device, assigning said first subset to said second device, a second subset to a third device, and so on until all subsets are assigned to different devices; and repeating said above step for each assigned code combination in each of said N devices.

19. The method, as set forth in claim 18, wherein said assigning step further comprises the step of storing said assigned code combinations for each device in a table indexed by said unique device numbers.

20. The method, as set forth in claim 16, wherein said assigning step includes the steps of:

performing a device number modulo M operation for each device;

creating a category for each unique result from said modulo operation;

assigning said devices to said created categories; and assigning a different set of code combinations to each device in each category, so that each device receives a different assignment in each category.

21. The method, as set forth in claim 16, wherein said X-bit code is a 5-bit code, four bits of which are used for signaling link selection, said code having $2^4$ or sixteen possible code combinations.

22. The method, as set forth in claim 16, wherein said X-bit code is an 8-bit code, seven bits of which are used for signaling link selection, said code having $2^7$ or 128 possible code combinations.

* * * * *